(12) United States Patent
Kruy et al.

(10) Patent No.: US 7,444,363 B2
(45) Date of Patent: Oct. 28, 2008

(54) DATABASE ITEM VERSIONING

(75) Inventors: Steven J. Kruy, Carnation, WA (US); William W. Ramos, Snoqualmie, WA (US); Patrick Dengler, Redmond, WA (US); Julia Zhenglei Liuson, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 554 days.

(21) Appl. No.: 10/868,111

(22) Filed: Jun. 15, 2004

(65) Prior Publication Data

US 2004/0230616 A1    Nov. 18, 2004

Related U.S. Application Data

(63) Continuation of application No. 09/235,038, filed on Jan. 21, 1999.

(51) Int. Cl.
*G06F 12/00* (2006.01)
*G06F 17/30* (2006.01)
*G06F 7/00* (2006.01)
*G06F 9/44* (2006.01)

(52) U.S. Cl. .................. 707/203; 707/104.1; 717/122

(58) Field of Classification Search ............ None
See application file for complete search history.

(56) References Cited

U.S. PATENT DOCUMENTS

| | | | |
|---|---|---|---|
| 4,558,413 A | 12/1985 | Schmidt et al. | 364/300 |
| 4,809,170 A | 2/1989 | Leblang et al. | 364/200 |
| 5,386,559 A | 1/1995 | Eisenberg et al. | 707/201 |
| 5,652,884 A | 7/1997 | Palevich | 713/1 |
| 5,724,556 A | 3/1998 | Souder et al. | 395/500 |
| 5,805,889 A * | 9/1998 | Van De Vanter | 717/107 |
| 5,896,530 A | 4/1999 | White | 707/102 |
| 5,966,707 A * | 10/1999 | Van Huben et al. | 707/10 |
| 6,094,684 A | 7/2000 | Pallmann | 709/227 |
| 6,112,024 A * | 8/2000 | Almond et al. | 717/122 |
| 6,115,710 A | 9/2000 | White | 707/10 |
| 6,115,711 A | 9/2000 | White | 707/10 |
| 6,145,119 A | 11/2000 | House et al. | 717/1 |
| 6,226,652 B1 * | 5/2001 | Percival et al. | 707/203 |
| 6,260,040 B1 | 7/2001 | Kaufmann et al. | 707/10 |

(Continued)

FOREIGN PATENT DOCUMENTS

EP    0 769 739 A2    4/1997

(Continued)

OTHER PUBLICATIONS

Eisenberg, A. "New Standard for Stored Procedures in SQL", *SIGMOD Record*, Dec. 1996, 25(4), 81-88.

(Continued)

*Primary Examiner*—Charles Rones
*Assistant Examiner*—Alicia M Lewis
(74) *Attorney, Agent, or Firm*—Woodcock Washburn LLP

(57) ABSTRACT

Database item versioning, such as items like stored procedures found in databases such as Standard Query Language (SQL) databases. In one embodiment, a program such as an editor, a database, a source and a mechanism. An editor program provides for editing a stored procedure. The databases includes the stored procedure. The SCC system stores versions of the stored procedure. The mechanism checks in and checks out the stored procedure to provide for effective versioning thereof.

24 Claims, 4 Drawing Sheets

U.S. PATENT DOCUMENTS

| | | | |
|---|---|---|---|
| 6,279,151 B1 * | 8/2001 | Breslau et al. | 717/140 |
| 6,349,407 B1 * | 2/2002 | Towfiq | 717/170 |
| 6,393,437 B1 | 5/2002 | Zinda et al. | 707/201 |
| 6,449,624 B1 | 9/2002 | Hammack et al. | 707/203 |
| 6,457,176 B1 * | 9/2002 | King | 717/173 |

FOREIGN PATENT DOCUMENTS

| | | |
|---|---|---|
| WO | WO 98/14869 | 4/1998 |

OTHER PUBLICATIONS

Haderle, D.J. et al., "Managing a Program's Set of SQL Statements in a Database Environment", *IBM Technical Disclosure Bulletin*, Aug. 1991, 34(3), 465.

Mendlen, D., "Versioning Stored Procedures with Visual Studio 6.0 and SQl Server 7.0", Nov. 1998.

Microsoft Visual SourceSafe Administrator and User's Guide, © 1992-1996, 667 pages.

"Stanford Technology: SQL Studio Version 2.0 extends Visual Interface to Oracle 7 for Programmers and DBAs", *Business Wire*, Jul. 12, 1994, 1-3.

Cox, T.B., Sneak Preview of SQL Studio 2.0 (Stanford Technologies Group Inc's GUI for Oracle 7), Data Based Advisor, Aug. 1994, 12(8), 1-2.

Jurvis, J., "FrontPage's Evolution for the Millennium", *Information Week*, May 17, 1999, 1-5, (Microsoft FrontPage 2000) (Product Development).

\* cited by examiner

DATABASE ITEM VERSIONING

CROSS-REFERENCE TO RELATED CASES

This application is a continuation of U.S. patent application Ser. No. 09/235,038, filed on Jan. 21, 1999, entitled "Database Item Versioning."

FIELD OF THE INVENTION

This invention relates generally to databases such as Structured Query Language (SQL) databases, and more particularly to the versioning of items such as text-stream stored procedures (SP's) of such databases.

BACKGROUND OF THE INVENTION

Databases have become increasingly popular and important in today's computerized world. While there are many different types of databases, one common database is the Structured Query Language (SQL) database. SQL is a language used to interrogate and process data in a relational database; SQL commands can be used to interactively work with a database or can be embedded within a programming language to interface to a database. Programming extensions to SQL have turned it into a full-blown database programming language.

Within a database (DB), a stored procedure (SP) is a SQL program that is stored in the database, and which is executed by calling it directly from a client or from a database trigger. When the SQL procedure is stored in the database, for example, it does not have to be replicated in each client. This saves programming effort, especially when different client user interfaces and development systems are used. A stored procedure can be viewed as a standard computer program in some respects, with one important difference: while standard computer programs are usually stored as one or more files on a storage such as a hard disk drive, a stored procedure is not stored as a separate file or files, but rather as text and binary streams within the database itself.

Enterprise (viz., wide-scale) SQL database developers and administrators commonly build mission-critical systems; the failure of which can be catastrophic. Therefore, they are protective of the code, such as stored procedures, that exist on both production and development databases. To store their code in such a manner as to ensure protection, developers usually use basic files, and then utilize long compile scripts to execute them and create their databases. This is less than desirable, however, since ultimately the database itself stores the code as a binary stream, as has been described.

Thus, once the databases are in production, anyone with system administrator permission can change code such as stored procedures, without any historical record as to what changes have been made. Bugs and errors introduced into the procedures, for example, may be difficult to trace. Furthermore, the database administrator is unable to examine how the code has changed over time. For these and other reasons, there is a need for the present invention.

SUMMARY OF THE INVENTION

The invention relates to the versioning of items such as stored procedures in databases. In one embodiment, a system includes a program such as an editor, a database, a source code control (SCC) system, and a mechanism. An editor program provides for the editing of an item such as a stored procedure of a database such as a SQL database. The database includes the stored procedure (for example, a version of the stored procedure), and the source code control system stores versions of the stored procedure. The mechanism provides for the checking in and checking out of the stored procedures. Besides stored procedures, the invention is applicable to any other item of databases, including but not limited to: views, triggers, constraints, persisted queries and scripts for creating any database object, such as tables, indexes, domains, etc., as those of ordinary skill within the art can appreciate.

In this manner, at least some embodiments of the invention provide for advantages not found in the prior art. For example, the mechanism that provides for checking in and checking out of the stored procedures of the database provides for effective versioning of the stored procedures. The mechanism keeps track of users who wish to edit the stored procedures, and once they have been changed, the mechanism keeps track of the changes that have been made to the stored procedures. Thus, when a bug or error has been introduced into a stored procedure can be determined, and the database administrator is able to determine the history of changes made to a particular stored procedure.

DETAILED DESCRIPTION OF THE INVENTION

Figure 1:
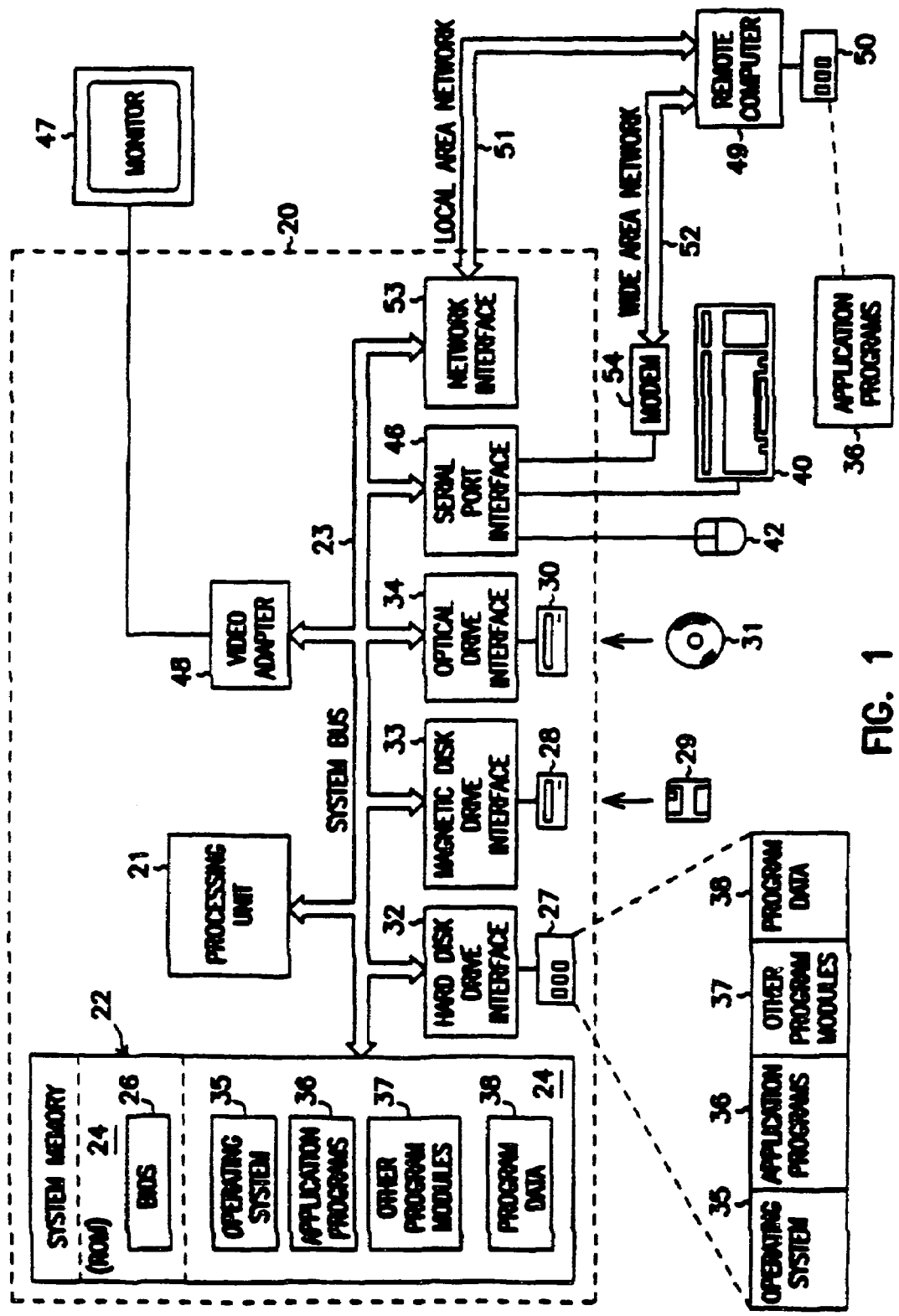
FIG. 1 shows a computer in conjunction with which embodiments of the invention may be practiced.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

For example, the following detailed description is provided in relation to database stored procedures. However, as those of ordinary skill within the art can appreciate, the invention is not limited to database items that are stored procedures, but can be applied to any other type of database items. Such items include, but are not limited to, views, triggers, constraints, persisted queries and scripts for creating any database object, such as tables, indexes, domains, etc.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computer

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System

Figure 2:
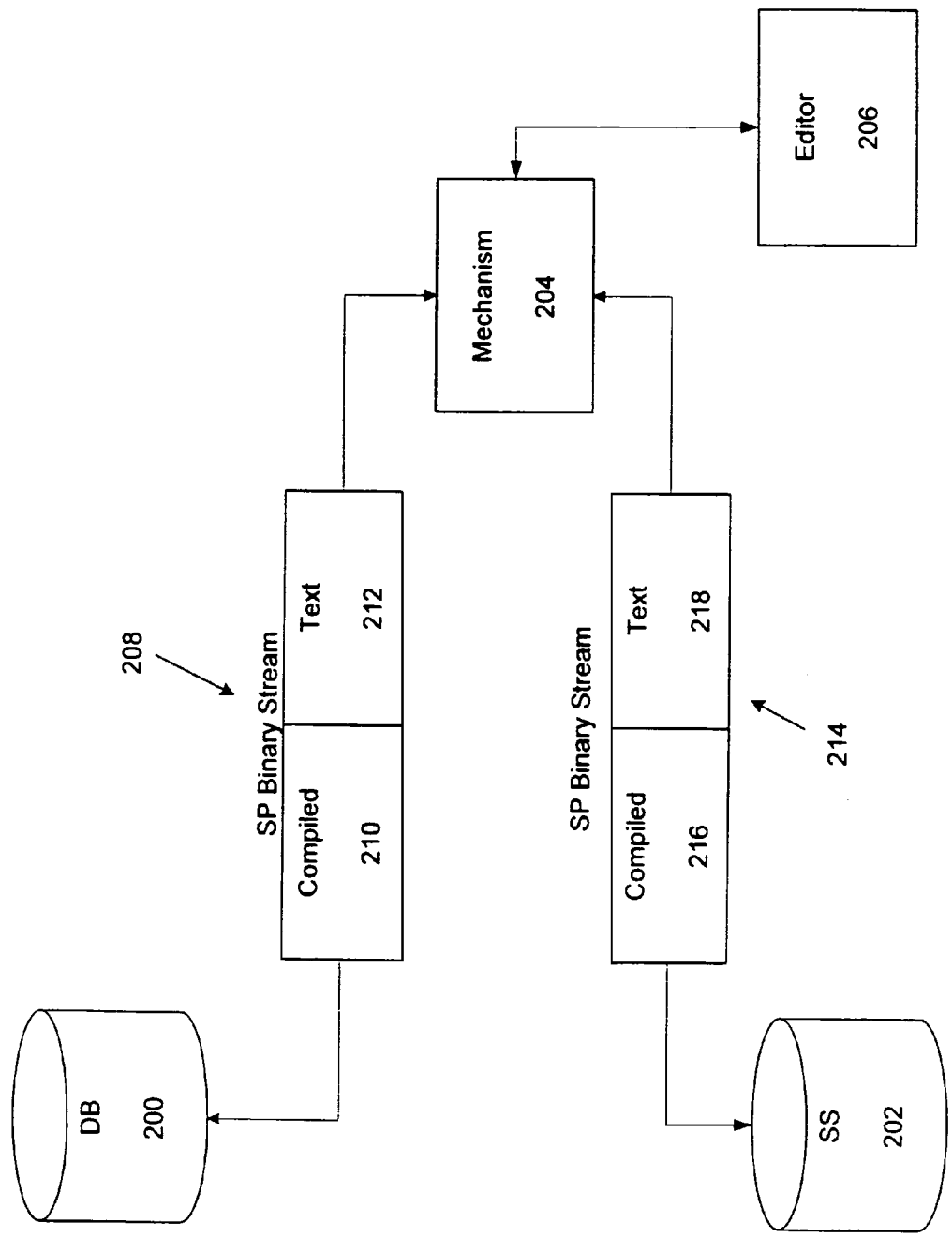
FIG. 2 shows a diagram of a computerized system in accordance with an embodiment of the invention.

Referring next to FIG. 2, a diagram of a system in accordance with an embodiment of the invention is shown. The system includes a database 200, a SCC system 202, a mechanism 204, and an editor 206. The system may be implemented over one or more computers, such as that described in the preceding section of the detailed description. In the case where the system is implemented over more than one computer, it may be implemented in what is known as a client-server architecture, or in what is known as a distributed system. The invention is not limited to a particular architecture, however, for the implementation of the system of FIG. 2.

The database 200 may be any type of database, such as a SQL database known in the art. The database 200 stores records, or data, and also code, such as stored procedures as have been described in the background section. One such stored procedure is shown as stored procedure 208, which is a binary stream including a compiled part 210 and a text part 212 (those of ordinary skill within the art can appreciate that the part 210 and the part 212 can in another embodiment be stored as separated streams). The text part 212 acts as the source code of the compiled part 210. Those of ordinary skill within the art can appreciate, however, that the text part 212 may not be present, such that only the compiled part 210 is present.

The SCC system 202 stores versions of stored procedures, such as the stored procedure 208 stored in the database 200, and the stored procedure 214. The stored procedure 214 also has a compiled part 216 and a text part 218. Like the stored procedure 208, the text part 218 of the stored procedure 214 acts as the source code of the compiled part 216. Those of ordinary skill within the art can appreciate that the text part 218 may not be present, such that only the compiled part 216 is present.

In one embodiment of the invention, the SCC system 202 is Visual Source Safe, from Microsoft Corp., which is a stand-alone product shipped as part of Visual Studio, a development environment for developing code such as stored procedures available from Microsoft Corp. The Visual Source Safe has OLE automation interfaces, as known in the art, for checking in and checking out different versions of code, such as stored procedures. The invention is not limited, however, to the embodiment utilizes Visual Source Safe and/or Visual Studio.

The SCC system 202, as those of ordinary skill within the art can appreciate, is not limited to only handling database (e.g., SQL database) streams, but in other embodiments of the invention, can store other types of streams, such as including but not limited to: C code, Microsoft Word or other word processor documents, etc.

Furthermore, "checking out" as referred to herein refers to the concept of tagging a given item such as a stored procedure such that the item is "in use" by a given user and otherwise cannot be edited or modified by another user (although this second user may be able to use a read-only version of the stored procedure), until the item has been checked back in. Thus, "checking in" as referred to herein refers to the concept of tagging a given item that has been previously checked out by a given user such that this user is finished modifying or editing the item—such that other users are now able to check out the item for their own modification, editing, etc.

Thus, the SCC system 202 is able to store different versions of the same piece of code—such as different versions of the same stored procedure. When a stored procedure is checked out, for example, edited, saved to the database, and checked back in, the new version of the stored procedure is saved to the SCC system, in a manner that provides for the changes between the new version and the previous version or versions to be viewed. That is, a change or version history of a given stored procedure can be provided by the SCC system 202.

The mechanism 204 is the manner by which a given stored procedure is actually checked into and out of the SCC system, so that the stored procedure of a database is not modified without versioning of the stored procedure taking place. Versioning is the process by which different versions of the stored procedure are kept track of, for example, by the SCC system 202. Thus, as shown in FIG. 2, a stored procedure of the database 200 cannot be accessed without the mechanism 204 knowing about the access, such that if modifications are made thereto, the mechanism 204 is able to indicate such changes as a new version of the stored procedure via the SCC system 202. In another embodiment, the database system 200 is itself able to invoke the mechanism 204, on any read access to the stream 212, to provide the benefits of the invention to users who do not choose to use the editor 206 as the computer program used to manipulate the stream 212, as described in the next paragraph.

The editor 206 is a specific type of a computer program that manipulates the stored procedures of the database 200. In particular, the editor 206 is a program that provides for the editing of the stored procedures of the database 200. The invention is not so limited to a program that is an editor program, however—that is, the invention is amenable to any type of computer program that is used to manipulate database items such as stored procedures of the database 200. In one embodiment, the editor 206 is part of the Visual Studio development environment already described, such that the editor 206 includes a "data view" of all the tables and the stored procedures, among other data and code, stored in the database 200. The invention is not so limited, however.

The system of FIG. 2 operates as follows. The editor 206 desires to retrieve a stored procedure of the database 200 for editing and modification. Thus, the editor 206 requests to check out the stored procedure, such that the mechanism 204 checks out the desired stored procedure thereto. The mechanism 204 does this as follows. It retrieves the stored procedure as stored in the database 200, as well as the same stored procedure as stored in the SCC system 202. If the version of the stored procedure in the database 200 is the same as in the SCC system 202, then this version is provided to the editor 206. Otherwise, the editor 206 has the ability to choose from either version as the version it wishes to edit and modify. If it is the SCC system version, then this version is automatically saved to the database 200 as the database version, too, by the mechanism 204. Thus, the version of the stored procedure at the database 200 can be either identical to or different than the version of the stored procedure at the SCC system 202.

Once the editor 206 has edited and modified the stored procedure, it is saved to the database 200 as the database version of the stored procedure. This version is then retrieved by the mechanism 204 to check into the SCC system 202 as the newest version of the stored procedure as saved by the SCC system 202. In other words, the mechanism 204 checks in (i.e., saves) the stored procedure into the SCC system 200, checking in the stored procedure as has been saved to the database 200.

Methods

In this section, a check-out method and a check-in method, according to different embodiments of the invention, are described. These methods can be performed, for example, by the mechanism 204 of the system of FIG. 2 that has been described in the preceding section, although the invention is not so limited. These computer-implemented methods are desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer.

Figure 3:
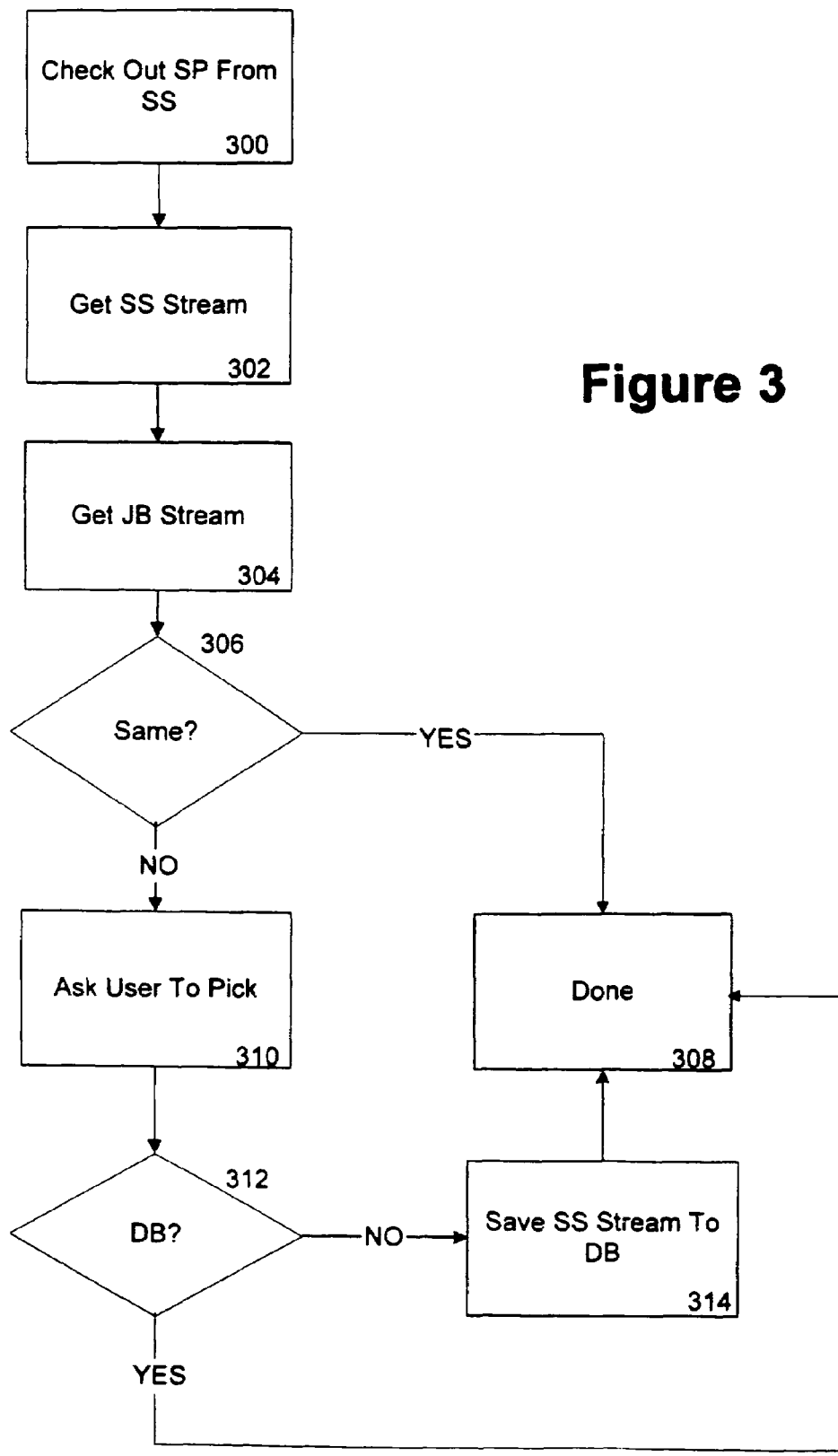
FIG. 3 shows a flowchart of a check-out method according to an embodiment of the invention; and, FIG. 4 shows a flowchart of a check-in method according to an embodiment of the invention.

Referring first to FIG. 3, a computer-implemented check-out method according to an embodiment of the invention is shown. The check-out method of FIG. 3 is a manner by which a stored procedure can be checked out from a SCC system, according to one embodiment. It may be performed, for example, when an editor or other program indicates to the mechanism that it wishes to edit or otherwise manipulate the stored procedure. In 300, the desired stored procedure is checked out from the SCC system—that is, it is indicated to the SCC system that the stored procedure is to be indicated as checked out. In 302, the SCC system version of the stored procedure stream is retrieved, and in 304, the database version of the stored procedure stream is retrieved.

In 306, the SCC system version of the stored procedure stream is compared to the database version of the stored procedure stream. If they are the same, then the method is done at 308—that is, the editor or other program can now conduct editing or other manipulation of the stored procedure. Otherwise, in 310, the user is asked to select either the SCC system version or the database version of the stored procedure stream. For example, this may be accomplished within the editor or other program that will be used to edit or otherwise manipulate the desired source procedure. If the database version is chosen, then the method proceeds from 312 to 308, and is done—that is, the editor or other program can now conduct editing or other manipulation of the stored procedure. Otherwise, in 314, the mechanism saves the SCC system version of the stored procedure stream to the database (such that the database version of the stored procedure stream is now the same as the SCC system version), and the method also ends at 308, where the editor or other program can now conduct editing or other manipulation of the stored procedure.

Figure 4:
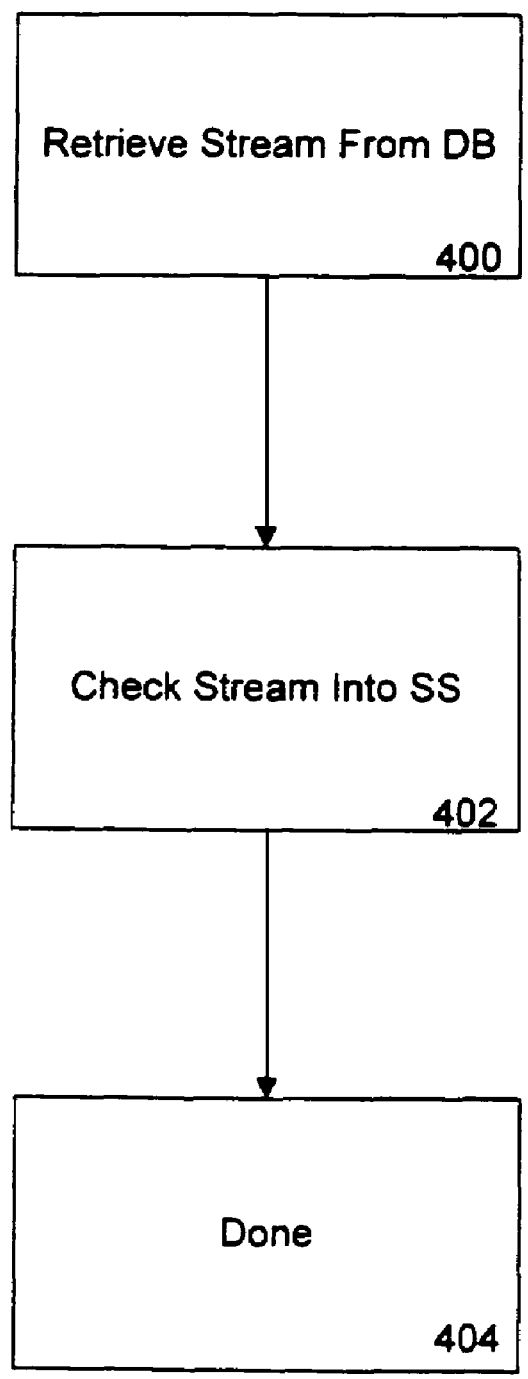

Once the editor or other program has finished its editing or other manipulation of the stored procedure, than the procedure must be checked back into the SCC system. This is accomplished by the method shown in FIG. 4. The method of FIG. 4 assumes that the stored procedure stream has already been saved by the editor or other program back to the database; however, the invention is not so limited—for example, this functionality can also be performed within the context of the method of FIG. 4, too. In 400, then, the stored procedure stream is retrieved by the mechanism, from the database (if the stream as modified or edited has not already been saved to the database, then this is first accomplished).

Next, in 402, this version of the stored procedure stream is checked back into the SCC system. That is, the stored procedure stream is saved to the SCC system as the newest version of this stored procedure. Furthermore, the SCC system is also told to indicate that the stored procedure stream has now been checked in, such that it may be subsequently check out. In at least one embodiment of the invention, for example, a stored procedure stream cannot be checked out unless it is indicated in the SCC system as having been checked in—that is, two different programs cannot check out the same stored procedure stream at the same time. The invention is not so limited, however. The method of FIG. 4 ends at 404.

CONCLUSION

Versioning of stored procedures of databases has been described. Although specific embodiments have been illustrated and described herein, it will be appreciated by those of ordinary skill in the art that any arrangement which is calculated to achieve the same purpose may be substituted for the specific embodiments shown. For example, the specification has been described in relation to database items that are stored procedures, but the invention itself is not so limited. This application is intended to cover any adaptations or variations of the present invention. For example, the invention can be used in relation to any type of database item, such as views, triggers, constraints, persisted queries and scripts for creating any database object, such as tables, indexes, domains, etc. Therefore, it is manifestly intended that this invention be limited only by the following claims and equivalents thereof.

We claim:

1. A computer-implemented method for a user to check out a database item from a source code control system, comprising:

comparing a database item stored in the source code control system with a database item stored in a database;

determining whether the compared database item in the source code control system is identical to the compared database item in the database;

if it is determined that the compared database item in the source code control system is identical to the compared database item in the database, checking out the database item; and if it is determined that the compared database item in the source code control system is not identical to the compared database item in the database:

providing the user a choice to select one of the database item in the source code control system and the database item in the database; and checking out the selected database item;

wherein a historic record of the checked out database item is maintained, permitting changes to the database item to be traced thus enabling determination of when a change was introduced.

2. The computer-implemented method of claim 1, further comprising, prior to comparing:

retrieving the database item from the source code control system; and retrieving the database item from the database.

3. The computer-implemented method of claim 1, further comprising saving the database item in the source code control system as the stream of the database item in the database, when the user selects the database item in the source code control system.

4. The computer-implemented method of claim 1, further comprising:
   comparing a version of the database item stored in the source code control system with a version of the database item stored in a database; and
   determining whether the version of the database item in the source code control system is the same as a version of the database item in the database.

5. The computer-implemented method of claim 1, further comprising the database checking out the database item.

6. The computer-implemented method of claim 1, further comprising a program other than the database checking out the database item.

7. The computer-implemented method of claim 1, further comprising wherein the database item selected by the user is at least one of the following: the same version of the database item, an older version of the database item, a newer version of the database item.

8. The computer-implemented method of claim 1, further comprising wherein the database item selected by the user is at least one of the following: the version stored in the database and the version stored in the source code control system.

9. The computer-implemented method of claim 1, further comprising manipulating the database item.

10. The computer-implemented method of claim 9, further comprising storing the manipulated database item in the source code control system.

11. The computer-implemented method of claim 9, further comprising further comprising storing the manipulated database item in the database.

12. The computer-implemented method of claim 1, further comprising restricting modification of the selected database item.

13. A computer-readable storage medium having instructions stored thereon for execution by a computer to perform a method, comprising:
   comparing a database item stored in the source code control system with a database item stored in a database;
   if it is determined that the compared database item in the source code control system is identical to the compared database item in the database, checking out the database item; and
   if it is determined that the compared database item in the source code control system is not identical to the compared database item in the database:
      providing the user a choice to select one of the database item in the source code control system and the database item in the database; and
      checking out the selected database item;
   wherein a historic record of the checked out database item is maintained, permitting changes to the database item to traced thus enabling determination of when a change was introduced.

14. The computer-readable storage medium of claim 13, the method further comprising, prior to comparing:
   retrieving the database item from the source code control system; and
   retrieving the database item from the database.

15. The computer-readable storage medium of claim 13, the method further comprising saving the database item in the source code control system as the stream of the database item in the database, when the database item in the source code control system is selected.

16. The computer-readable storage medium of claim 13, the method further comprising:
   comparing a version of the database item stored in the source code control system with a version of the database item stored in a database; and
   determining whether the version of the database item in the source code control system is the same as a version of the database item in the database.

17. The computer-readable storage medium of claim 13, the method further comprising the database checking out the database item.

18. The computer-readable storage medium of claim 13, the method further comprising a program other than the database checking out the database item.

19. The computer-readable storage medium of claim 13, the method further comprising wherein the selected database item is at least one of the following: the same version of the database item, an older version of the database item, a newer version of the database item.

20. The computer-readable storage medium of claim 13, the method further comprising wherein the selected database item is at least one of the following: the version stored in the database and the version stored in the source code control system.

21. The computer-readable storage medium of claim 13, the method further comprising manipulating the database item.

22. The computer-readable storage medium of claim 21, the method further comprising storing the manipulated database item in the source code control system.

23. The computer-readable storage medium of claim 21, the method further comprising storing the manipulated database item in the database.

24. The computer-readable storage medium of claim 13, the method further comprising restricting modification of the selected database item.

* * * * *